United States Patent [19]

Haugland et al.

[11] Patent Number: 5,103,767
[45] Date of Patent: Apr. 14, 1992

[54] METHOD AND A MACHINE FOR THE VACCINATION OF FISH

[75] Inventors: Ommund O. Haugland, Stavanger; Willy Helgesen, Madla, both of Norway

[73] Assignee: Trio Industrier A/S, Forus, Norway

[21] Appl. No.: 476,378

[22] PCT Filed: Nov. 4, 1988

[86] PCT No.: PCT/NO88/00084
§ 371 Date: May 29, 1990
§ 102(e) Date: May 29, 1990

[87] PCT Pub. No.: WO89/04601
PCT Pub. Date: Jun. 1, 1989

[30] Foreign Application Priority Data

Nov. 27, 1987 [NO] Norway .................... 874951

[51] Int. Cl. ................................. A01K 61/00
[52] U.S. Cl. ................................. 119/3
[58] Field of Search ................. 119/3; 609/99

[56] References Cited

U.S. PATENT DOCUMENTS 3,229,326 1/1966 Eriksen ..................... 17/2

FOREIGN PATENT DOCUMENTS

| 77232 | 7/1950 | Norway . |
| 81853 | 5/1953 | Norway . |
| 111420 | 10/1964 | Norway . |
| 120102 | 8/1970 | Norway . |
| 136558 | 5/1972 | Norway . |
| 147662 | 2/1983 | Norway . |

OTHER PUBLICATIONS

Norsk Fiskeoppdrett, vol. 1, 1984, Roger Engeset og Knut Engjom, "Noen erfaringer med stikkvaksinering av laksesmolt", p. 20.
Derwent's Abstract No. H1402c/33, SU 706036.
Vakzinationsverfahren und vakzinearten bei Fischen, eine Literaturübersicht. Diss. Tierärztliche Hochschule, Hannover (FRG), Inst. Mikrobiol. Tierseuchen 1985, K. Mielke, p. 22.

Primary Examiner—Stephen C. Pellegrino
Assistant Examiner—Michael Rafa
Attorney, Agent, or Firm—Griffin Branigan & Butler

[57] ABSTRACT

In a method for vaccinating fishes, the fishes are first anaesthetized in a vessel (1) containing anaesthetic-admixed water. From the vessel, the fishes-as they are anaesthetized and as a consequence thereof sink to the bottom-are conveyed upwards anad transferred to an unidirectional device (4). The unidirectional device (4) ensures that the further conveyed fishes are carried head first in a feeding direction. From the unidirectional device (4), the fishes are individually carried, via an edgewise-turner (6) ensuring turning of the fishes edgewise, into a vaccination device (7) having injection means for individual vaccination of each fish. A machine for carrying out this method comprises a conveyor (2) for conveying anaesthetized fishes from the vessel (1) to the unidirectional device (4), wherefrom the fishes are individually carried, via the edgewise-turner (6), into a vaccination chamber (15) provided with vaccination devices for vaccination of the fishes individually.

16 Claims, 2 Drawing Sheets

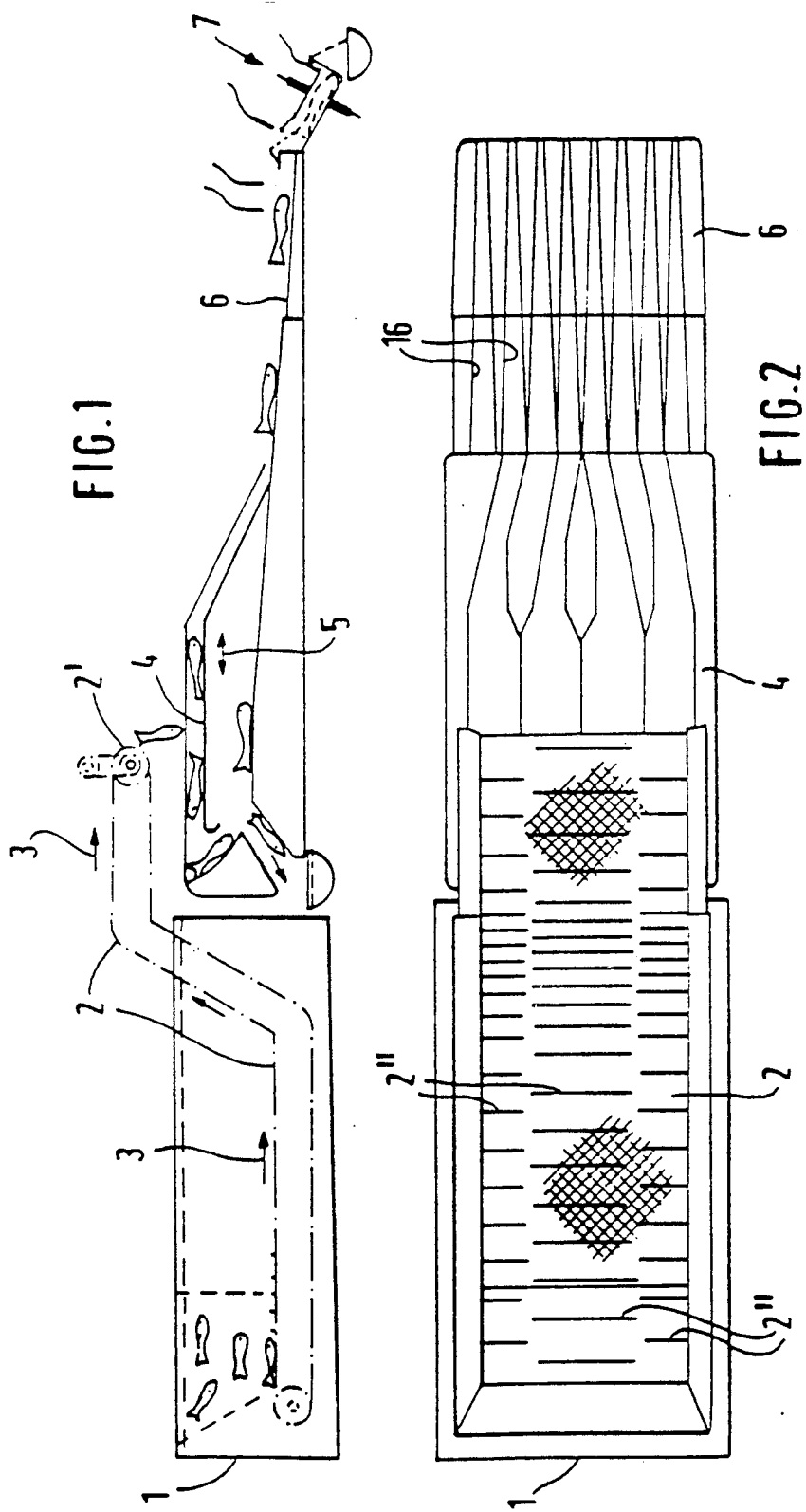

METHOD AND A MACHINE FOR THE VACCINATION OF FISH

BACKGROUND OF THE INVENTION

The present invention relates to a method and a machine for the vaccination of fishes, especially trout and salmon fry.

Today, vaccination of fishes takes place either by hand or by placing the fishes in a bath containing a vaccine.

Manual vaccination of fishes is very time-consuming and consequently very expensive. At the same time, a vaccination capacity is too low in relation to a need therefor. By means of manual vaccination only a small part of the fish fry can thus be vaccinated each year, considering the extent to which breeding takes place today.

"Bathing" the fishes in vaccine-containing water represents a rapid and expensive method. In practice it has been found that it is not particularly efficient in that only about 60% of fishes become thereby vaccinated.

U.S. Pat. No. 3,229,326 relates to an arrangement for feeding fishes from a vessel containing water to a machine for non-specified fish treatment. The method and machine taught by this prior patent specification exhibit features which advantageously may be utilized in the vaccination of fishes. In U.S. Pat. No. 3,229,326 a method for treatment of fishes is disclosed wherein fishes, which are in a vessel containing water, are conveyed upwardly by a conveyor and carried onto a unidirectional device which ensures that the fishes are fed head first in a feeding direction by means of an edgewise-turner which turns the fishes edgewise to a fish treatment machine. The machine disclosed in U.S. Pat. No. 3,229,326 comprises a vessel containing water, a conveyor extending downwardly into the vessel for conveying fish upwardly from the vessel. The conveyor delivers fishes to an unidirectional device having self-feeding motion (reciprocal motion, vibratory motion) in a feeding direction of the fishes. The unidirectional device ensures that the fishes are fed head first in the feeding direction to the edgewise-turner coupled after the unidirectional device wherein the unidirectional device, having self-feeding motion (reciprocal motion, vibration), comprises longitudinal chutes which, in combination with its self-feeding motion, turn the fishes, so that the fishes, lying edgewise, arrive at the fish treatment machine.

It is a purpose of the present invention to eliminate disadvantages of previous vaccination methods and to provide an efficient method which allows for rapid and lenient (non-injurious) vaccination of each individual fish. It is a further purpose of this invention to provide a machine for carrying out this method which is reliable, of high capacity and capable of ensuring precision vaccinations of the fishes.

SUMMARY OF THE INVENTION

In accordance with the invention, this can be achieved by features appearing in the following claims in which features known from U.S. Pat. No. 3,229,326 appear in the preambles of claims 1 and 2, respectively.

A method for the vaccination of fish according to this invention thus comprises in its broad features the step of anaesthetizing fishes by placing them briefly in an appropriate bath, from where they are transported upwards by means of a suitable conveyor for thereafter being subjected to unidirectional positioning, preferably followed by edgewise turning, for mechanical vaccination. The invention is based on the knowledge that fishes being anaesthetized, sink to a bottom. Thus, a portion of the conveyor extending substantially parallel to the bottom of an anaesthetic-containing vessel, and adjacent thereto, will only pick up anaesthetized fishes from the vessel, in that fishes not yet anaesthetized will continue to swim closer to the surface of the bath. The anaesthesia has primarily the purpose of eliminating movements of the fishes during subsequent treatment thereof. Each single fish is fed, head first, towards a vaccination device—in order to secure vaccination at a correct spot—lying either on its back or on its belly. There are two groups of opposing, individually activated, vaccination means, with a means in the one group providing for the vaccination of a fish lying on its belly, while a means in the other group provides for the vaccination of a fish lying on its back.

A machine for carrying out this method comprises an anaesthetizing vessel, a conveyor, e.g. a so-called "swan neck" conveyor, extending down into the vessel adjacent to its bottom for conveying anaesthetized fishes up from the vessel to a reciprocating, vibrating unidirectional device which serves to uni-direct the fishes with their heads in front, in the direction of advance. Thereafter, the fishes preferably arrive at an edgewise-turning device having self-feeding motion for turning the fishes so that their bellies are directed upwards, with the fishes being further individually conveyed to the vaccination device. As the fishes, as mentioned, may be vaccinated also lying with their backs directed upwards, operation of the edgewise turner is not critical when carrying out the invention in practice. Preferably, the machine is computer-controlled.

BRIEF DESCRIPTION OF THE DRAWING

The invention is further explained in the following in association with an embodiment of a method for the vaccination of fish in accordance with the invention and with reference to the accompanying drawings, which illustrate a preferred embodiment of a machine for carrying out this method. The drawings are not necessarily to scale, emphasis instead being placed upon illustrating principles of the invention in a clear manner.

FIG. 1 is a diagrammatical schematical side view, partly in vertical section, of a machine formed in accordance with the invention;

FIG. 2 is a top plan view of the machine of FIG. 1, wherein the vaccination device is omitted.

DESCRIPTION OF THE PREFERRED EMBODIMENT

Figure 3:
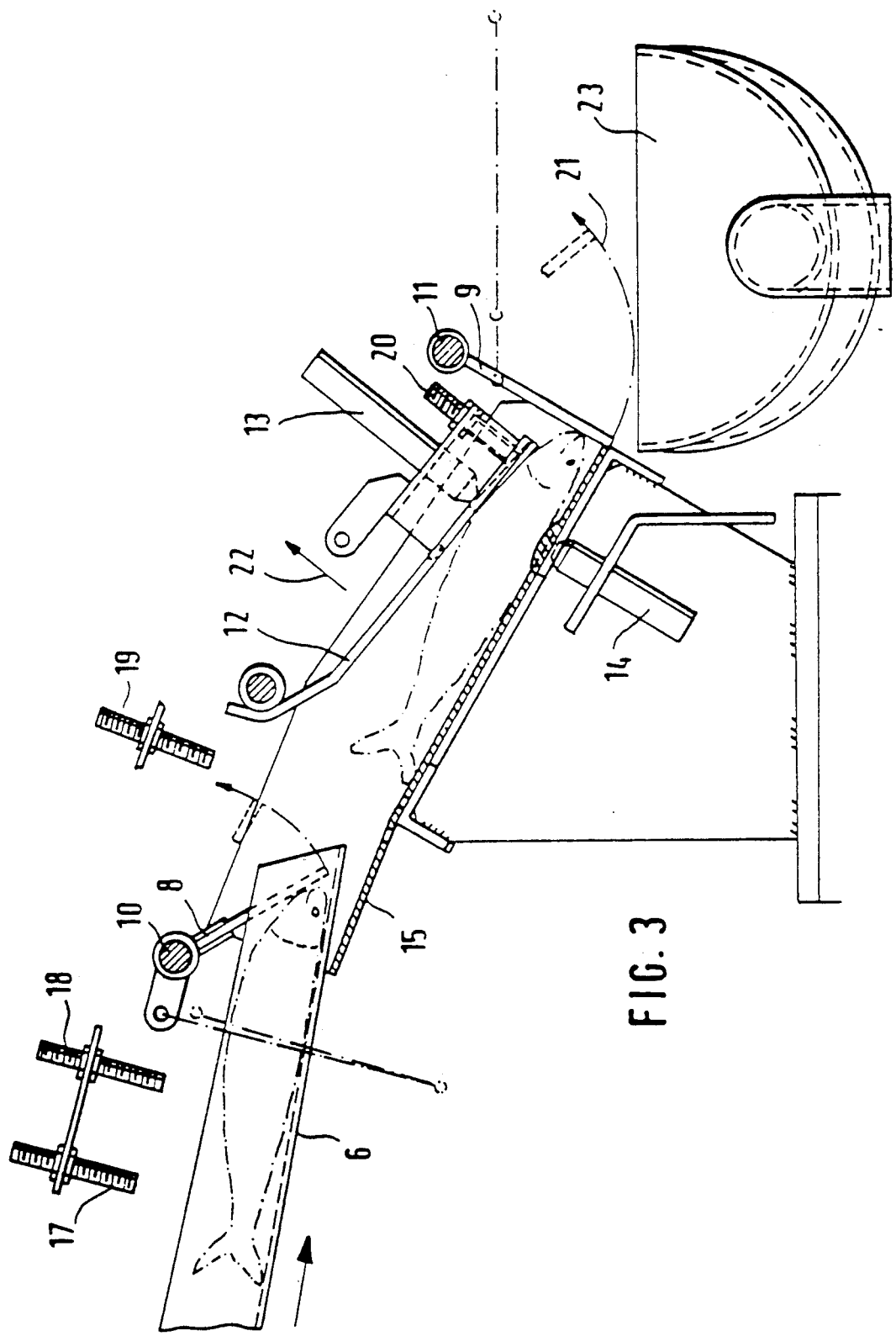
FIG. 3 is, on a larger scale, a segmented, side sectional view of a portion of the machine of FIGS. 1 and 2 in an area of and immediately prior to a vaccination device, and wherein further details of electronic control units are included.

In the drawings, FIGS. 1 and 2, the reference numeral 1 denotes an anaesthetizing vessel wherein an anaesthetic-containing bath is maintained.

Fishes to be vaccinated are placed in the anaesthetizing bath in the vessel 1. As previously mentioned, fishes being anesthetized, will sink to a bottom of the vessel 1, wherein a so-called "swan-neck"-conveyor 2 is arranged, the direction of movement being defined by arrows 3. The conveyor 2 has a course comprising a portion extending parallel to the bottom of the vessel and adjacent to the same; an upwardly sloping portion; and an adjoining, horizontal portion, the end 2' of which is located above an unidirectional device 4 having reciprocal self-feeding motion according to a dual arrow 5.

The conveying belt of the conveyor 2 may consist of wire cloth, FIG. 2, and is provided with lateral carriers in the form of ledges 2". These carrier ledges 2" are laterally divided into three columns, with carrier ledge parts of respective columns being mutually displaced in a longitudinal direction of the conveying belt in relation to carrier ledge parts in adjacent columns. This arrangement of the carrier ledges 2" ensures a more uniform supply of fishes to the unidirectional device 4 than with parallel undivided lateral ledges.

The unidirectional device 4 provides in a known manner for uni-directing (or aligning) each fish so that it, during continued feeding, is oriented head first. Fishes not unidirected in this manner, are returned to the anaesthetizing vessel 1 in a manner not specifically shown, see FIG. 1.

From the unidirectional device 4 the fishes arrive at an edgewise-turning device 6 having self-feeding motion (reciprocal motion). The edgewise-turner 6 provides for turning each fish, preferably belly up, so that, belly or back up, the fish arrives at a vaccination device 7, which is indicated in FIGS. 1 and 3 and omitted from FIG. 2.

Reference is now made to FIG. 3. At a completion, or downstream, end of the edgewise-turner 6, in front of the vaccination device 7, a flap 8 is arranged and, following the vaccination device 7, a corresponding flap 9 is arranged. The flaps 8, 9 are pivotable about horizontal shafts 10 and 11, respectively. A starter position for the vaccination device 7 presupposes that the flap 8, extending in the path of motion of the fishes, is located in an open or turned-up position, while the flap 9, likewise extending in the fishes' path of motion, occupies a closed position. Furthermore, the starter position presupposes that a pivotable fixation plate 12 is in a turned-up position. The fixation plate 12 serves to fix each fish by resting against it during vaccination. These turning movements are effected by means of pneumatic pressure cylinders (not shown).

The vaccination device 7 comprises a top and bottom group of injection means 13 and 14, respectively. An upper or lower injection means is used depending on whether a fish arrives at the vaccination device lying on its back or its belly, so that the injection, in each individual case, takes place in the belly region.

An electronic control may comprise, for example, a system for identical channels or vaccination chambers 15, to which chutes 16 formed in the edgewise-turning device 6 lead.

To each vaccination chamber 15 belong four detectors 17, 18, 19 and 20. The detectors 17 and 18 are located immediately after each other at the completion, or downstream, portion of the edgewise-turner 6, and the detectors 19 and 20 are located respectively at an initiation, upstream, end of the vaccination chamber 15 and at its completion, downstream, end.

Each vaccination chamber comprises five control signals relating to flap 8, flap 9, fixation plate 12, upper injection means 13 and lower injection means 14, respectively. All control signals have two conditions, off/on.

Additionally, the electronic plant, or system, may count the number of vaccinated fishes per vaccination chamber 15 and the total number of fishes vaccinated. These data are displayed on a screen (not shown) and registered on a printer (not shown).

The sequence of carrying out a process of this invention for one vaccination chamber 15 is as follows:

Detector 17 detects whether a fish is present at a controlled area of the edgewise-turner 6. In case it does not detect a fish, a new detection is made by means of the detector 17.

Detector 18 is activated subsequent to a minor time delay if the flap 9 is open (turned-up; see arrow 21). Detector 18 gives a signal as to whether a detected fish is lying belly or back up.

Thereafter, the flap 9 closes, and the flap 8 opens.

Then detector 19 is activated. When it detects a fish, the flap 8 is closed, so that only one fish at a time is received in each vaccination chamber 15. The flap 8 is flexible and follows the body of the fish. The flap 8 may consist of soft rubber and will slide over a fish on its way into the vaccination chamber 15, but will close for the next following fish.

After a minor time delay, the fixation plate 12 is activated and rotates downwardly against the fish to rest thereon.

Detector 20 is activated and detects when sufficient fixation pressure by the plate 12 is achieved. Thereafter, the fixation plate is maintained at this pressure.

Depending on a directional detection by the detector 18, injection means 13 or 14 is activated, so that the injection takes place in the belly of the fish. In the situation of FIG. 3, the injection means 13 is activated, as the fish is lying belly up in the vaccination chamber 15.

After injection is effected in the vaccination chamber 15, the fixation plate 12 is turned upwards (see arrow 22).

Then, when the detector 20 detects that the fixation pressure of the plate 12 is reduced, the flap 9 is opened so that the vaccinated fish falls into a water chute 23 or another device for further transport.

Thereby, one sequence is completed, and a new sequence is started.

A vaccination machine of the design shown, using eight parallel identical vaccination chambers, will have a vaccination capacity of 200-300 fishes a minute.

We claim:

1. A method for the vaccination of fishes, especially trout and salmon fry, wherein fishes to be treated are in a vessel containing water and wherefrom they are conveyed upwards by a conveyor and carried onto an unidirectional device which ensures that the fishes are fed head first in a feeding direction, via an edgewise-turner which turns the fishes edgewise, to a fish treatment device, wherein the improvement comprises first the fishes are anaesthetized in the vessel containing water by admixing the water with anaesthetic and they thereby sink to the bottom of the vessel, and, following the above-mentioned unidirectional and edgewise-turning operations, the fishes, one by one, are transported into a vaccination chamber having injection means, for individual vaccination of the fishes.

2. A machine for vaccinating fishes comprising a vessel containing water, a conveyor extending downwards into the vessel for conveying fishes up from the vessel, said conveyor delivering the fishes to an unidirectional device having self-feeding motion for moving the fishes in a feeding direction of the fishes, said unidirectional device including means for ensuring that the fishes are fed head first in the feeding direction to an edgewise-turner coupled after the unidirectional device, said edgewise-turner having self-feeding motion for moving the fishes and comprising longitudinal chutes which turn the fishes, so that, lying edgewise, they arrive at a fish treatment device, wherein the improvement comprises, the vessel contains an anaesthetizing bath, and said fish treatment device comprises at least one vaccination chamber, which is provided with an injection means for vaccinating fishes individually.

3. Machine as defined in claim 2 wherein it comprises a plurality of mutually parallel vaccination chambers parallel to the feeding direction of the fish and corresponding to longitudinal chutes formed in the edgewise-turner.

4. Machine as defined in claim 2 wherein the conveyor is a so-called "swan-neck"-conveyor having a first substantially horizontal portion extending along a bottom of the anaesthetizing vessel, and to which is joined an upwardly sloping portion the upper end of which si located above a level of the bath and to which is joined a substantially horizontally extending portion the end of which is located above the unidirectional device.

5. Machine as defined in claim 2 wherein the conveyor, comprising a conveying belt, has lateral carriers each extending over a limited portion of the conveying belt's width, and which are displaced in a longitudinal direction of the conveying belt in relation to adjacent carriers, for thereby ensuring a more uniform supply of fishes to the unidirectional device.

6. Machine as defined in claim 2 wherein at each of both upstream and downstream ends of the vaccination chamber a pivotable flap is located, said flaps being operated by a power-driven means and controlled by electronic detectors located at a downstream completion portion of the edgewise-turner and at a downstream completion end of the vaccination chamber.

7. Machine as defined in claim 6 wherein the vaccination chamber is provided with a pivotable fixation plate adapted to rest against and fix one fish in the vaccination chamber, said fixation plate being operated by a power-driven means and associated with an electronic detector, which is located at the downstream completion end of the vaccination chamber, said electronic detector including means to react to a fixation pressure of the fixation plate which upon a reduced pressure following vaccination operates the flap located downstream of the vaccination chamber so that vaccinated fish may leave the machine.

8. Machine as defined in claim 6 wherein, upstream of the vaccination chamber first and second electronic detectors are arranged, one after the other in the feeding direction of the fishes, and wherein the first detector is adapted to detect whether a fish is present in a controlled area, and wherein the second detector, which is activated after a minor time delay in relation to the first detector, is adapted to register and deliver a signal indicating if a fish is lying belly or back up.

9. Machine as defined in claim 6 wherein the pivotable flap upstream of the vaccination chamber is made of flexible material so that it may slide over a fish moving into the vaccination chamber, but which will close for a next following fish.

10. Machine as defined in claim 2 wherein the vaccination chamber is provided with two opposing injection means for vaccinating each fish lying belly up or back up, respectively, so that an injection in each individual case takes place in a belly region of the fish.

11. Machine as defined in claim 3 wherein the conveyor is a so-called "swan-neck"-conveyor having a first substantially horizontal portion extending along a bottom of the anaesthetizing vessel, and to which is joined an upwardly sloping portion, the upper end thereof being located above a level of the bath and to which is joined a substantially horizontally extending portion the end of which is located above the unidirectional device.

12. Machine as defined in claim 3 wherein the conveyor, comprising a conveying belt, has lateral carriers each extending over a limited portion of the conveying belt's width, and which are displaced in a longitudinal direction of the conveying belt in relation to adjacent carriers, for thereby ensuring a more uniform supply of fish to the unidirectional device.

13. Machine as defined in claim 4 wherein the conveyor, comprising a conveying belt, has lateral carriers each extending over a limited portion of the conveying belt's width, and which are displaced in a longitudinal direction of the conveying belt in relation to adjacent carriers, for thereby ensuring a more uniform supply of fish to the unidirectional device.

14. Machine as defined in claim 3 wherein at both upstream and downstream ends of each vaccination chamber, respectively, a pivotable flap is located, said flap being operated by a power-driven means and controlled by electronic detectors located at a downstream completion portion of the edgewise-turner and at a downstream completion end of the vaccination chamber.

15. Machine as defined in claim 4, characterized in that, both upstream and downstream of the vaccination chamber a pivotable flap is located, said flap being operated by a power-driven means and controlled by electronic detectors located at a downstream completion end of the vaccination chamber.

16. Machine as defined in claim 5, characterized in that, both upstream and downstream of the vaccination chamber a pivotable flap is located, said flap being operated by a power-driven means and controlled by electronic detectors located at a downstream completion portion of the edgewise-turner and at a downstream completion end of the vaccination chamber.

* * * * *

UNITED STATES PATENT AND TRADEMARK OFFICE
CERTIFICATE OF CORRECTION

PATENT NO. : 5,103,767

DATED : April 14, 1992

INVENTOR(S) : Oddmund O. Haugland and Willy Helgesen

It is certified that error appears in the above-identified patent and that said Letters Patent is hereby corrected as shown below:

On the title page, item (75):

Correct the spelling of the first inventor's name to be

--Oddmund O. Haugland--.

Signed and Sealed this

Fifteenth Day of June, 1993

Attest:

MICHAEL K. KIRK

Attesting Officer      Acting Commissioner of Patents and Trademarks